United States Patent [19]

Krambrock et al.

[11] 4,096,640
[45] Jun. 27, 1978

[54] METHOD AND APPARATUS FOR THERMAL TREATMENT OF OR FOR MATTER-EXCHANGE WITH POURABLE MATERIAL

[75] Inventors: Wolfgang Krambrock, Ravensburg; Hansjörg Schwedes, Cologne; Wolfgang Richter, Refrath; Klaus Elgeti, Schildgen, all of Germany

[73] Assignee: Waeschle Maschinenfabrik GmbH, Germany

[21] Appl. No.: 720,451

[22] Filed: Sep. 3, 1976

[30] Foreign Application Priority Data

Sep. 2, 1975 Germany ............................ 2539042

[51] Int. Cl.$^2$ .......................... F26B 3/08; F27B 15/00
[52] U.S. Cl. ...................................... 34/10; 34/57 A; 432/14; 432/58
[58] Field of Search ....................... 34/10, 57 A, 57 R; 432/14, 15, 58

[56] References Cited

U.S. PATENT DOCUMENTS 2,735,803  2/1956  Leffer ...................................... 34/10
3,241,520  3/1966  Wurster et al. ....................... 34/57 A
3,911,594  10/1975  McIntire et al. .................... 34/57 A

FOREIGN PATENT DOCUMENTS 1,045,626  10/1966  United Kingdom ................. 432/15

Primary Examiner—John J. Camby
Attorney, Agent, or Firm—Michael J. Striker

[57] ABSTRACT

Pourable particulate material is accommodated in a vessel. A stream of gaseous fluid is directed into the lower end of the vessel and is split up into a high-speed first flow and a second flow. The material surrounding the bottom end of a central upright unobstructed passage in the vessel is entrained by the first flow and conveyed upwardly to be deposited on top of the body of material in the vessel; since new material from the body slides down about the lower end to be entrained in this manner, the body of material is gradually turned over in the vessel. The lower-speed second flow is directed through the body of material outside the passage to trickle through the material and subject the same to a treatment.

13 Claims, 1 Drawing Figure

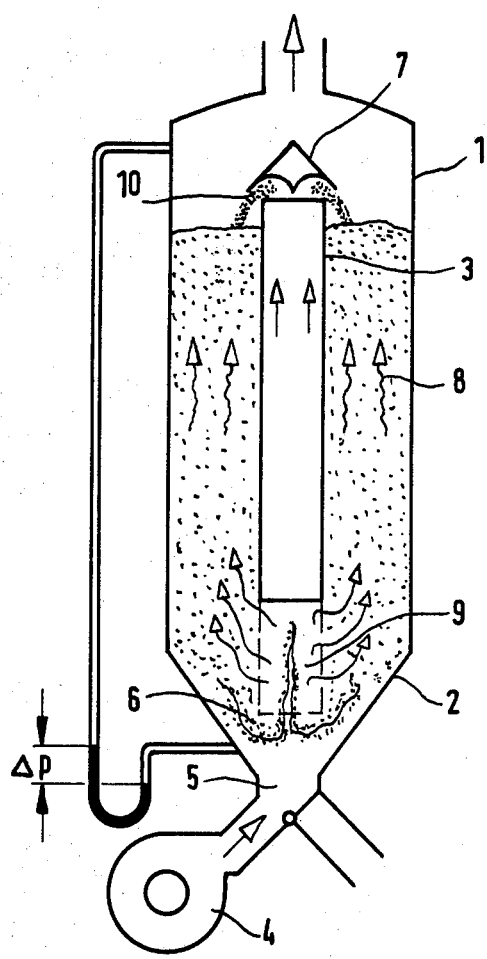

METHOD AND APPARATUS FOR THERMAL TREATMENT OF OR FOR MATTER-EXCHANGE WITH POURABLE MATERIAL

The invention relates to a method and an apparatus for thermal treatment of or for matter exchange with pourable material, according to which the pourable material is placed into a container and air, the physical characteristics of which correspond to the treatment to be applied, is made to pass through it from below to above.

The simplest possibility for heat- or matter exchange with pourable materials is offered by the fluidized-bed or vortex-layer method, wherein a gas stream flows over a porous bottom through the fill and the flow-through speed is chosen so high that the contact forces between the individual particles are overcome by the flow energy. As is known, the pourable material then behaves similar to a liquid. In this method, local increases in the flow velocities make it possible to obtain a turnover of the pourable material, whereby heat- and matter exchange are intensified, as is known.

While in the case of pulverulent goods flow-through velocities about 0.1 m/s suffice to obtain fluidized-bed conditions, in the case of coarse-grain particles, e.g. synthetic plastic granulate, approximately a 10-fold airspeed is needed to bring the fill to this condition. Because of this, the method becomes uneconomical for coarse particles and one therefore settles for flow through the resting pourable material at low flow speeds.

Disadvantageous in this are the large dwell times which are determined by heat- and matter-exchange parameters, 'dead zones' through which there is no flow and in which no heat- and matter exchange is effected, and a frequently occurring clumping and adhering of the pourable particles during a heating-, cooling-, moistening- or drying-process.

The invention has the purpose of creating a method of the type mentioned in the introduction and an apparatus for carrying it out, which make it possible to treat the pourable material completely, gently, energy-conservingly and with a short dwell time.

This problem is solved by the invention set forth in the claims.

It has been found that the basic concept of the invention, namely the separation of the supplied airstream into an airstream effecting the actual treatment and an airstream effecting the systematic turn-over of the pourable material, combines it in the advantages of the fluidized-bed treating method and of the method which operates with the pourable material at rest, whereas the specific disadvantages inherent in the two main methods, i.e. in the first case high energy use and danger of separation when mixtures of pourable materials are treated, in the latter case incomplete treatment and the danger of clump formation. The method according to the invention has been found particularly superior for the treatment of granulate-type pourable materials.

In the drawing, an apparatus for carrying out the method of the invention is shown diagrammatically simplified on hand of an exemplary embodiment.

The pourable material to be heated, cooled, dried or de-gassed is filled into a container 1 with a conical bottom 2 and central tube 3. The lower section 9 of the central tube consists of porous material, e.g. sieve fabric, which makes the flow-through of gas possible but prevents passage of pourable-material particles.

With the aid of a gas compressor 4 gas is directed through the opening 5 into the fill. Because of the lower flow resistance the gas flows predominantly through the central tube, whereby it entrains pourable material which slides down through the gap 6 between the central tube and the container wall and conveys it pneumatically to the upper end of the central tube 3 where it is deflected with the aid of a shielding cone 7 and is deposited again on the surface of the fill.

The pressure difference $\Delta p$ obtaining between the lower end and the upper end of the central riser tube causes a part of the gas stream to travel as a trickle-flow in accordance with the arrows 8, through the pores of the fill which is practically at rest. This trickle-flow essentially effects the desired heat-and matter exchange. The flow in the central riser tube, however, is of almost no consequence for the heat-and matter exchange, because of the very low dwell time of the particles. It only effects a turn-over and movement of the fill. However, via the size of the area of the porous section 9 of the central tube it is now possible to determine the gas quantity which, due to the pressure in the central tube which is higher than the pressure in the fill, flows from the central tube into the fill and as a trickle-flow through the same. This guarantees a flow through the fill with simultaneous turnover and, in appropriate circumstances, mixing of the material to be treated.

A further possibility of increasing the quantity of gas issuing from the porous section 9 resides in reducing the distance between upper edge of riser tube and shielding cone 7, to increase the pressure difference $\Delta p$.

We claim:

1. A method of treating pourable material, comprising the steps of
   accommodating a body of the pourable material in a vessel having a lower end and a central, upright unobstructed passage provided with a bottom end portion which is surrounded by the material;
   directing a stream of gaseous fluid into the lower end of the vessel;
   splitting the stream into a high-speed first flow and a second flow;
   entraining the material surrounding the bottom end portion with the high-speed first flow and conveying it upwardly in the central passage, so that due to the repetition of such entraining the body of material becomes gradually turned over in the vessel; and
   directing the second flow through the body outside the central passage, so as to trickle through and treat the material of the body.

2. A method as defined in claim 1, wherein the volumes into which said stream is split are dependent upon said body.

3. Apparatus for treating pourable material, comprising an upright container having a bottom and a central upright tube which bounds with an inner wall surface of said container an annular gap having a lower open end and in which a body of pourable material is accomodated; means for admitting a stream of gaseous fluid under pressure into said container in the region of said bottom so that it entrains the portions of flowable material located at said lower end and conveys them at high speed through said central tube in upward direction to thereby effect a gradual turn-over of the body of pourable material in said clearance; and means for diverting some of the gaseous fluid of said stream in the region of said gap from said central tube into said annular clearance for trickle-flow through said body of pourable material in upward direction so as to treat the pourable material without fluidizing the same.

4. Apparatus as defined in claim 3, wherein said bottom of said container comprises a funnel-shaped bottom wall.

5. Apparatus as defined in claim 4, wherein said means for admitting comprises a central opening in said bottom wall, and a supply conduit communicating with said central opening.

6. Apparatus as defined in claim 3, said container having an upper end portion and comprising port means at said upper end portion for communicating the exterior of said container with the interior thereof.

7. Apparatus as defined in claim 3, said central tube having a bottom end and said bottom of said container comprising a funnel-shaped bottom wall which defines with said bottom end an annular gap constituting said lower open end of said annular clearance.

8. Apparatus as defined in claim 3, said central tube having an upper open end; and further comprising baffle means above and spaced from said upper open end for intercepting and deflecting said stream of gaseous fluid which flows through said central tube.

9. Apparatus as defined in claim 8, said baffle means comprising a baffle element having a surface facing towards said bottom of said container and configurated for deflecting the entrained pourable material in direction towards said bottom so as to deposit it on top of the pourable material accommodated in said annular clearance.

10. Apparatus as defined in claim 3, wherein said central tube has a bottom end and said bottom of said container comprises a funnel-shaped bottom wall defining with said bottom end an annular gap which constitutes said lower open end of said clearance, the width of said annular gap being adjustable.

11. Apparatus as defined in claim 3, wherein said means for directing comprises a gas-permeable lower end section of said central tube.

12. Apparatus as defined in claim 11, wherein said lower end section is of a screen fabric.

13. Apparatus as defined in claim 11, wherein the length of said gas-permeable end section is variable for varying the portion of said stream of gaseous fluid which is diverted from said central tube into said annular clearance.

* * * * *